United States Patent
Bebee et al.

(10) Patent No.: US 10,432,639 B1
(45) Date of Patent: Oct. 1, 2019

(54) SECURITY MANAGEMENT FOR GRAPH ANALYTICS

(71) Applicant: Amazon Technologies, Inc., Seattle, WA (US)

(72) Inventors: Bradley R. Bebee, Seattle, WA (US); Bryan B. Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 15/587,313

(22) Filed: May 4, 2017

(51) Int. Cl.
| | |
|---|---|
| *H04L 29/06* | (2006.01) |
| *G06T 1/20* | (2006.01) |
| *G06T 11/20* | (2006.01) |
| *G06F 16/901* | (2019.01) |
| *G06F 16/903* | (2019.01) |

(52) U.S. Cl.
CPC ........ *H04L 63/101* (2013.01); *G06F 16/9024* (2019.01); *G06F 16/90335* (2019.01); *G06T 1/20* (2013.01); *G06T 11/206* (2013.01); *H04L 63/083* (2013.01); *G06T 2210/52* (2013.01)

(58) Field of Classification Search
None
See application file for complete search history.

(56) References Cited

U.S. PATENT DOCUMENTS

| | | | | |
|---|---|---|---|---|
| 7,181,059 | B2* | 2/2007 | Duvdevani | G06K 9/00973 348/125 |
| 9,836,183 | B1* | 12/2017 | Love | G06T 11/206 |
| 2005/0108576 | A1* | 5/2005 | Munshi | H04L 63/0464 726/4 |
| 2010/0268520 | A1* | 10/2010 | Llopis Llopis | B82Y 10/00 703/11 |
| 2012/0137367 | A1* | 5/2012 | Dupont | G06F 21/00 726/25 |
| 2015/0082399 | A1* | 3/2015 | Wu | G06F 21/6209 726/6 |
| 2016/0071233 | A1* | 3/2016 | Macko | G06F 16/9024 345/440 |

OTHER PUBLICATIONS

Li, Na et al. The Legitimacy Detection for Multilevel Hybrid Cloud Algorithm Based Data Access. 2015 IEEE International Conference on Software Quality, Reliability and Security—Companion. https://ieeexplore.ieee.org/stamp/stamp.jsp?tp=&arnumber=7322139 (Year: 2015).*

(Continued)

*Primary Examiner* — Jeremiah L Avery
(74) *Attorney, Agent, or Firm* — Robert C. Kowert; Meyertons, Hood, Kivlin, Kowert & Goetzel, P.C.

(57) ABSTRACT

A bit vector representing access permissions associated with respective vertices of a graph data set is generated. At least a portion of the bit vector is read, and a first graph analytics algorithm is performed. The algorithm comprises determining, based at least in part on a portion of the bit vector, whether access permission to one or more vertices of the graph data set is granted.

20 Claims, 9 Drawing Sheets

(56) References Cited

OTHER PUBLICATIONS

Wang, Wei et al. Exploring Permission-Induced Risk in Android Applications for Malicious Application Detection. IEEE Transactions on Information Forensics and Security, vol. 9, Issue: 11. https://ieeexplore.ieee.org/stamp/stamp.jsp?tp=&arnumber=6891250 (Year: 2014).*

McCune, et al., "Thinking Like a Vertex: a Survey of Vertex-Centric Frameworks for Large-Scale Distributed Graph Processing," Jul. 17, 2015, pp. 1-3, Published inACM Computing Surveys (CSUR) Surveys Homepage archive vol. 48 Issue 2, Article No. 25.

Shuai Che, "GasCL: A Vertex-Centric Graph Model for GPUs," (c) 2014 IEEE, pp. 1-6.

Gonzalez, et al., "GraphX: Graph Processing in a Distributed Dataflow Framework," Proceeding OSDI'14 Proceedings of the 11th USENIX conference on Operating Systems Design and Implementation pp. 599-613, Oct. 6-8, 2014.

Zhisong Fu, et al., "MapGraph: A High Level API for Fast Development of High Performance Graph Analytics on GPUs," GRADES'14, Jun. 22-27, 2014, Snowbird, UT, USA Copyright 2014 ACM, pp. 1-6.

Matrix Market, "Text File Formats," downloaded from http://math.nist.gov/MatrixMarket/formats.html on Nov. 6, 2016, pp. 1-7.

Zhisong Fu, et al., "Parallel Breadth First Search on GPU Clusters," SCI Institute Technical Report, The University of Utah, Jul. 29, 2014, pp. 1-10.

Duane Merrill, et al., "Scalable GPU Graph Traversal," PPoPP'12, Feb. 25-29, 2012, New Orleans, Louisiana, USA., Copyright © 2012 ACM, pp. 1-11.

Dehnert, et al., "Pregel: A system for large-scale graph processing," ResearchGate, Conference Paper—Jan. 2009, DOI: 10.1145/1582716.1582723—Source: DBLP, pp. 1-12.

U.S. Appl. No. 15/354,981, filed Nov. 17, 2016, Bradley R. Bebee, et al.

* cited by examiner

Graph 350

Graph input data file 301

NumRows, NumColumns, NumEdges
5 5 6

Edges with weights
1 2 1
1 3 1
2 4 0.5
3 4 1
3 5 1
4 5 0.25

Required permissions and key URIs for vertices
1 A <uri-1>
2 A|C <uri-2>
3 A|B <uri-3>
4 A|C <uri-4>
5 A|C <uri-5>

US 10,432,639 B1

SECURITY MANAGEMENT FOR GRAPH ANALYTICS

BACKGROUND

Graph data structures comprising nodes and links are used to represent a wide variety of information for numerous types of computer-based applications. For example, applications associated with social networks, drug discovery, precision medicine, fault prediction in large distributed systems, cyber-defense, fraud detection, regulation compliance and the like may all employ graphs for representing respective sets of entities and relationships among the entities. Graph representations of complex dependencies are especially important for various types of machine learning algorithms, which are increasingly used in a number of problem domains. In some cases the information represented in different portions of a graph may have respective associated security requirements, such that access to some portions of the graph may be restricted. Developing scalable graph analysis applications which can handle a wide range of graph data sets with associated security constraints may represent a non-trivial technical challenge.

Figure 1:
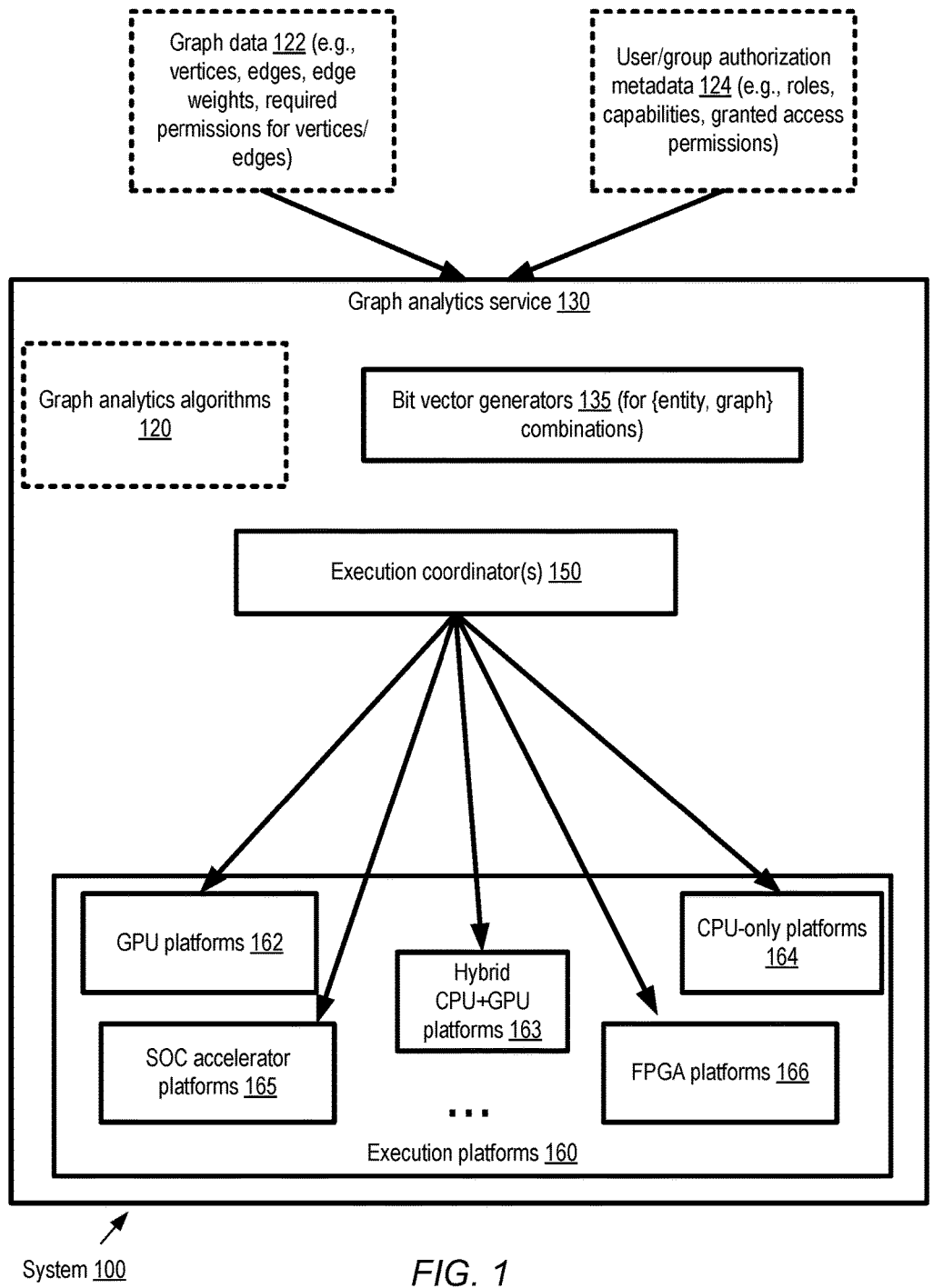
FIG. 1 illustrates an example system environment in which bit vectors representing access permissions may be utilized to perform graph analytics algorithms, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of methods and apparatus for enforcing security constraints (e.g., vertex-level and/or edge-level access permissions) during executions of graph analytics algorithms at a variety of execution platforms are described. According to one embodiment, a graph data set on which one or more graph analytics algorithms are to be executed may be obtained at one or more computing devices of an analytics system. The graph data set may comprise very large numbers (e.g., millions or billions) of vertices and/or edges in some embodiments, and at least some of the individual vertexes or edges may have associated access permissions. A given access permission associated with a vertex or edge may be expressed, for example, as a Boolean combination of tokens or terms indicating respective sets of entities (e.g., users or user groups) permitted to access the content of the vertex, or permitted to traverse the edge in some embodiments. In at least one embodiment, users or groups may be assigned roles or capabilities, e.g., at an identity management service or an authorization service associated with an analytics system, and the permissions may be expressed at least in part in terms of the roles or capabilities. For example, with respect to a graph data set in which vertices represent patients and/or treatment data associated with one or more health-care facilities, in one embodiment a particular set of physicians (with user accounts assigned an "oncologist" role) may be permitted to access a first subset of vertices and edges, another set of physicians (with user accounts assigned a "pediatrician" role) may be permitted to access a second subset of the graph, facility administrators (with user accounts assigned an "admin" role) may be permitted to access a third subset of the graph, and so on.

If and when a particular graph analytics algorithm, such as a breadth first search algorithm or a shortest path algorithm, is to be run on a graph data set on behalf of a particular entity or user at an analytics system, security constraints such as access permissions on the graph elements may be taken into account using pre-constructed bit vectors in one embodiment. A bit vector whose bits represent respective permissions granted with respect to respective vertices or edges to the entity on whose behalf the algorithm is going to be executed may be generated in some embodiments. In one embodiment, such a bit vector may be generated on demand, e.g., in response to a particular analytics request received from a particular entity, and then stored for potential re-use (e.g., in case a request to run another analytics algorithm, or to re-run the same analytics algorithm, is received later). In another embodiment, a set of likely users, user groups or the like on whose behalf graph analytics algorithm are to be run on a given data set may be identified, and a respective bit vector may be generated for each of the users or groups, e.g., in advance of a specific request to execute a particular algorithm on behalf of a particular entity. In some embodiments, access permission bit vectors may be generated for subsets of a graph—e.g., it may be the case that a given algorithm may only require access to a subset of the vertices and edges, so a bit vector may not necessarily include bits for all the vertices or edges. In at least one embodiment, at least some bit vectors may be sparse (e.g., the number of vertices to which a given entity is granted permission may represent a small fraction of the total number of vertices), and compressed representations may be used for storing and/or transmitting the bit vectors.

In one embodiment, more than one type of permission may be grantable with respect to various graph elements— e.g., some users may be granted permission to run algorithm A on a subset of vertices, while other users may be granted permission to run algorithm A and algorithm B. In such an embodiment, multiple bit vectors corresponding to the different types of permissions may be generated for each {entity, graph} combination of interest. In some embodiments, a given graph element such as a vertex may have multiple bits associated with it in the vector for a particular entity, with each of the bits representing a different type of permission. Respective bits may be used to represent permissions associated with aggregations of graph elements in some embodiments—e.g., one bit may be used to represent permissions to a sub-graph rather than an individual vertex or edge. In one embodiment, the creation of the bit vector may be considered the rough logical equivalent of pre-computing a projection or subset of a potentially very large join operation (e.g., in which information about the structure of the graph is joined with information about the access permissions associated with the graph elements, and then a subset of the join result which is applicable to one or more entities is extracted). In one embodiment, a data structure other than a bit vector (such as a hash map) may be generated to represent the access permissions associated with a given entity and a given graph data set.

After a bit vector indicative of a given entity's access permissions to various elements of a graph data set is generated, in one embodiment at least a respective portion of the vector may be transmitted or provided to individual execution platforms of at which a graph analytics algorithm may be run in behalf of the entity. The respective portion (or all) of the bit vector may be read at an execution platform and used to decide whether various operations are permitted on behalf of the entity during the execution of the algorithm. A number of different kinds of execution platforms may be employed in different embodiments, such as for example a platform which includes one or more graphical processing units (GPUs), one or more central processing units (CPUs), at least one CPU and at least one GPU, a field programmable gate array (FPGA) device, or an accelerator comprising a system on chip (SOC). In at least some embodiments, an approach which involves the parallel execution of at least some portions of the analytics algorithm at numerous execution platforms (or numerous execution threads of a given platform) may be employed for large data sets (e.g., for data sets whose vertex count or edge count exceeds a threshold).

A variety of graph analytics algorithms, including implementations of breadth first search (BFS), single-source shortest path (SSSP), web page ranking algorithms, connected components algorithms, and the like, may utilize the pre-computed bit vectors in different embodiments. The algorithm may be executed using any of a number of execution frameworks or models in various embodiments, including for example the gather-apply-scatter (GAS) model discussed below in further detail. During the execution of a given algorithm, the bit vector may be used to determine whether an operation or computation is to be performed on a vertex or an edge in one embodiment. For example, before applying a user-defined function (UDF) to a vertex $V_i$ in such an embodiment, and/or before including $V_i$ in a frontier (a set of vertices to be analyzed at a particular stage of the algorithm), the bit corresponding to $V_i$ may be examined to ensure that $V_i$ is accessible to the entity on whose behalf the analytics algorithm is being performed. If the bit indicates that the entity is not granted permission, the operation may not be performed in various embodiments. In at least one embodiment, the graph analytics algorithm may be iterative in nature, and the pre-computed bit vector may be re-used during multiple (e.g., in some cases millions or billions) of iterations.

In some embodiments, a parallel execution environment utilized for the graph analytics algorithm may comprise a plurality of hardware or software execution threads which access one or more temporary shared data structures to perform various computations. In one such implementation, when a determination is made by one of the threads $T_i$, e.g., using the bit vector, that a particular vertex or edge $V_i$ or $E_i$ is inaccessible to the entity on whose behalf the algorithm is being run, that thread may store a special symbol (e.g., a "−1") in a shared data structure, indicating that an operation associated with $V_i$ or $E_i$ is not to be performed. Other threads $T_j$ may be able to read the special symbol efficiently from the shared data structure in such an implementation, and may thereby reduce the amount of processing required for their portions of the workload. In some embodiments, the use of such special symbols may be piggybacked on to the algorithm's uses of shared memory that would have occurred even if access permissions were not being considered (e.g., the use of shared memory for reducing duplication of vertices in frontiers generated by the different threads), so the security-related processing may not require much extra work. After the algorithm is executed at one or more execution platforms, its results may be stored and/or transmitted to one or more entities or destinations in various embodiments.

In one embodiment, a graph analytics system may implement one or more programmatic interfaces, which may be used for example to submit analytics requests and receive corresponding results, to indicate input graph data sets, to provide or change access permission metadata associated with graph data sets, and so on. Access permission metadata may be provided to such a system in a variety of formats using any of a variety of communication protocols in different embodiments. For example, in one embodiment extensions to a data exchange format (such as a version of the Matrix Market format) may be used to indicate the access permissions using Boolean combinations of tokens as discussed below in further detail.

According to at least one embodiment, the task of generating the bit vectors for a large data set or a large set of entities may itself be parallelized—e.g., different computing devices or servers may be employed to generate different portions of a given bit vector in parallel, or bit vectors for different combinations of {entity, graph} may be generated in parallel at respective computing devices. In one embodiment in which different portions of the bit vector are generated at respective computing devices, the portions may be aggregated, forming a complete bit vector for the graph, prior to being transmitted to the execution platforms where the algorithm is going to be performed. In some embodiments, a repository of pre-created bit vectors may be maintained for various combinations of entities and graphs, and such pre-created bit vectors may be re-used as and when needed (e.g., when a different algorithm is to be run on a given data set for the same entity, or for an entity with the same permissions). In one embodiment, as discussed below in further detail, resources of one or more network-accessible services of a provider network or cloud-based computing environment may be acquired and employed for various aspects of graph analytics operations.

Example System Environment

FIG. 1 illustrates an example system environment in which bit vectors representing access permissions may be utilized to perform graph analytics algorithms, according to at least some embodiments. As shown, system 100 may comprise various components of a graph analytics service 130 in the depicted embodiment. In at least one embodiment, the graph analytics service 130 may comprise one or more bit vector generators 135, one or more execution coordinators 150 and a set of execution platforms 160. The execution coordinators 150, individual ones of which may comprise one or more computing devices, may be responsible for orchestrating the execution of a plurality of graph analytic algorithms 120 on various input data sets using combinations of one or more execution platforms 160 in the depicted embodiment.

In one embodiment, input comprising graph data 122 and user/group authorization metadata 124 may be received at the graph analytics service 130, e.g., via one or more programmatic interfaces. Input graph data 122 may comprise respective representations of one or more graphs in the depicted embodiment, where each graph comprises a set of vertices or nodes and a set of directed or undirected edges. In some embodiments, individual edges may have weights associated with them, e.g., representing characteristics of the relationships between the vertices linked by the edges. Security constraints (such as required access permissions) associated with various elements of a graph, such as individual vertices, edges, or sub-graphs may also be obtained as part of the graph data 122 in at least some embodiments. In one embodiment, the graph data may indicate the access permissions required to read and/or manipulate data represented by various elements of the graphs, e.g., as Boolean combinations of permission tokens or terms. User/group authorization metadata 124 may indicate the permissions granted to various users, groups or accounts on whose behalf various graph analytics algorithms are to be run. In some embodiments, the access permissions may be expressed in the form of roles and/or capabilities defined at an authorization subsystem—for example, users or user groups may be assigned zero or more roles from a set of defined roles, individual roles may have associated capabilities, and the access permission requirements for a given graph element may indicate the capabilities or roles to which various types of access are granted. In some embodiments, the user/group authorization metadata may comprise a set of rules to be applied—e.g., a rule may indicate that employees of a specified department of an organization are to be allowed access to graph vertices which store information meeting a specified criterion.

Corresponding to a given graph and a given entity (such as a user or group) on whose behalf a graph analytics algorithm may be executed, one or more bit vectors representing the access permissions granted to the entity for that graph may be created in the depicted embodiment, e.g., by bit vector generators 135 implemented using one or more computing devices. Individual bits of the vector may correspond to respective graph elements (such as individual vertices or edges) in some embodiments, and may indicate, whether the corresponding element is "visible" to the entity for the purposes of performing various types of algorithmic computations or operations. In one embodiment, a bit vector corresponding to a particular {entity, graph} may be generated at a single computing device or server. In another embodiment, the task of generating the bit vector may be parallelized, and respective partitions of the bit vector may be generated at a plurality of computing devices. In some embodiment, a bit vector may be generated in response to receiving a request to execute a given algorithm on behalf of a particular entity. In other embodiments, bit vectors representing permissions granted on a given graph to numerous users or groups may be generated in advance of receiving a request to execute an algorithm on behalf of any given entity.

At least a portion of a bit vector corresponding to a particular entity and a particular graph may be transmitted or provided to a selected set of one or more execution platforms, e.g., by an execution coordinator 150 in the depicted embodiment. In some embodiments, the entire bit vector may be transmitted to all the execution platforms of the set, while in embodiments, respective partitions or subsets of the bit vector may be provided to individual ones of the execution platforms. A representation of at least a portion of the graph and an indication of the algorithm to be executed (such as executable code for the algorithm) may also be provided to the execution platforms in some embodiments. In order to perform the algorithm while ensuring that security constraints are not violated, the bit vector (or the supplied portion of the bit vector) may be read at the execution platforms in addition to the graph itself in various embodiments. The algorithm may be executed at the set of execution platforms. During execution at a given execution platform 160, at least a portion of the bit vector may be examined to determine whether a given operation is to be performed on a given vertex or edge in the depicted embodiment. A result of the execution of the algorithm may be stored and/or provided to one or more destinations in some embodiments.

In one embodiment, an execution coordinator 150 may identify a set of compute kernels corresponding to a graph analytic algorithm to be executed, and select one or more execution platforms 160 based at least in part on the set of available execution platforms which are optimized or tuned for the compute kernels. A variety of hardware execution platforms may be used in different embodiments. In one embodiment, a platform 162 may comprise one or more GPUs. In another embodiment, a platform 164 comprising one or more CPUs and no GPUs may be used. A hybrid platform 163 comprising one or more CPUs and one or more GPUs may be used in one embodiment. Platforms containing one or more field programmable gate arrays (FPGAs) 166 may be used in one embodiment. A platform 165 which includes accelerators for various algorithms, which may be implemented using SOC (system-on-chip) architectures may be used in one embodiment.

An execution platform 160 may comprise a group of hardware or software threads with access to a shared portion of a memory in some embodiments. For example, an execution platform with a GPU may include a thread block or a cooperative thread array (CTA) in one embodiment. In such an embodiment, after examining or reading a portion of the bit vector corresponding to a particular vertex or edge, a symbol (such as a "−1") indicating that one or more operations of the algorithm are not to be performed on a particular vertex may be stored in a data structure (such as a hash table or array indexed by vertex identifier) in the shared memory by one of the threads. Other threads of the group may examine the symbol from the shared memory, and determine that a particular operation should not be performed based on the symbol, e.g., without having to examine the bit vector itself.

In one embodiment, multiple graph analytics algorithms may be executed or performed on a given graph data set for a given entity over time, or a given graph analytics algorithm may be run multiple times on the same graph data set. In such an embodiment, a bit vector generated for one of the executions may be stored, e.g., at a storage location or database selected by an execution coordinator or bit vector generator, and re-used as needed for another algorithm or a repeated execution of the same algorithm.

Example Bit Vectors

Figure 2:
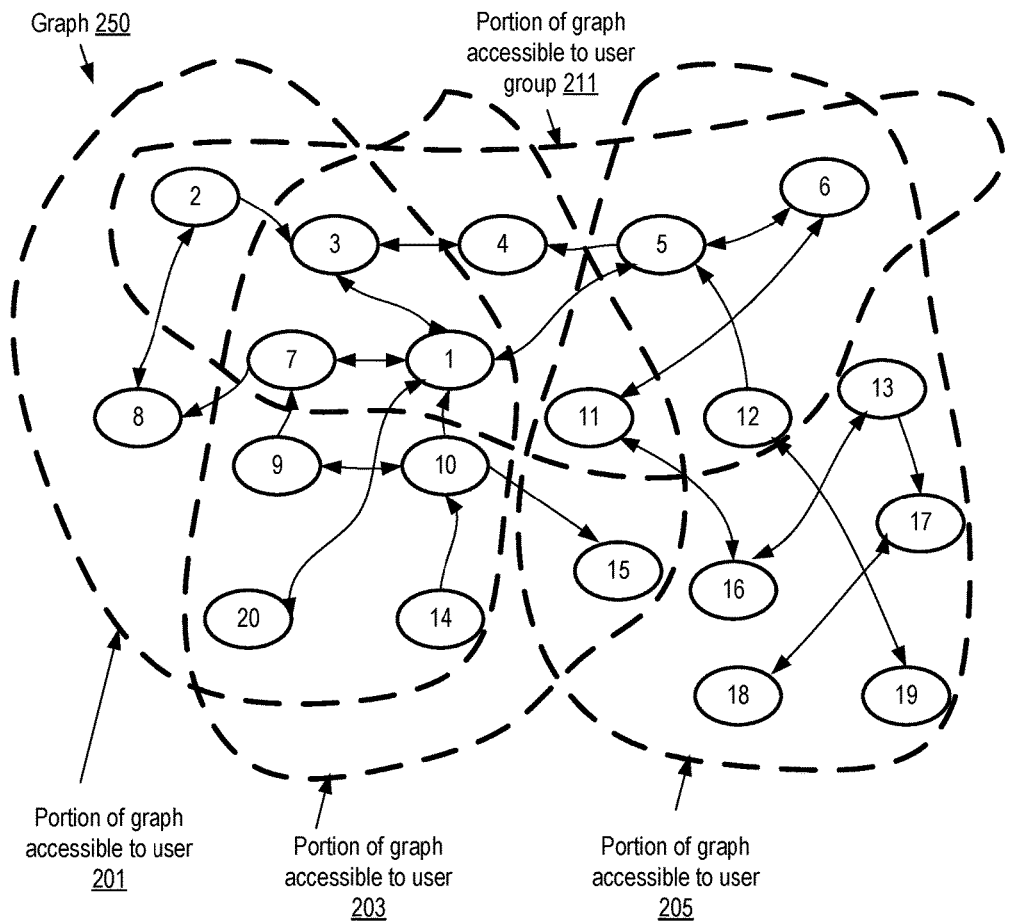
FIG. 2 illustrates examples of vertex permission bit vectors associated with a graph, according to at least some embodiments.

In some embodiments, a bit vector may include access permission information about graph vertices only; in other embodiments, the bit vector may include entries for edges, or for vertices as well as edges. FIG. 2 illustrates examples of vertex permission bit vectors associated with a graph, according to at least some embodiments. As shown, example graph 250 comprises twenty vertices labeled from 1 to 20, with several of the vertices linked to other vertices via unidirectional or bidirectional edges. As mentioned earlier, graphs comprising millions or billions of nodes and edges may be processed in practice in various embodiments. A very small graph is shown in FIG. 2 to illustrate, while avoiding clutter, the manner in which permissions may be represented using bit vectors in one embodiment.

One or more graph analytics algorithms may be run on the graph 250 on behalf of at least four entities in the embodiment depicted in FIG. 2: user 201, user 203, user 205 and user group 211. The users and/or user groups may be defined at an authorization system or service associated with the graph analytics service in some embodiments. As shown, user 201 is granted permission to perform one or more types of operations of at least one graph analytics algorithm on the set of graph vertices (1, 2, 3, 7, 8, 9, 10, 14 and 20) in the depicted scenario. A respective 20-bit vertex permission bit vector (VPBV) 221 may be generated for each of the four entities in one embodiment, where individual bits of the vertex represent individual vertices, with a "1" value indicating that access permission is granted to a given vertex, and a "0" indicating that access permission is not granted. Thus, for example, bits at positions 1, 2, 3, 7, 8, 9, 10, 14 and 20 (assuming a starting offset of 1) are set to "1" in VPBV 221A (1110 0011 1100 0100 0001) generated for user 201, corresponding to the vertices to which user 201 is granted access. Similarly, VPBV 221B (1011 0010 1100 0110 0001) indicates that the vertices with labels 1, 3, 4, 7, 9, 10, 14, 15 and 20 are accessible to user 203, VPBV 221C (0000 1100 0011 1011 1110) indicates that vertices labeled 5, 6, 11, 12, 13, 15, 16, 17, 18 and 19 are accessible on behalf of user 205, and VPBV 221D (1111 1110 0011 0000 0000) indicates that vertices 1, 2, 3, 4, 5, 6, 7, 11 and 12 are accessible to members of user group 211.

In one embodiment, bit vectors 221 (or portions thereof) may be read at various execution platforms during execution of a given algorithm on behalf of a given entity to determine whether access permission required to perform a given operation on a given vertex (such as implementing a user-defined function, including the vertex in a frontier, or including an edge associated with the vertex in a frontier) has been granted to the entity. It is noted that at least in some embodiments, the enforcing of the access permissions may be performed such that the user is not necessarily made aware of the access restrictions imposed on the user, or of the fact that there is a subset of the graph to which access is not granted. For example, in one embodiment, from the perspective of a given user, a request to perform or execute a particular algorithm (or obtain a particular result such as a shortest path) may be submitted with respect to a particular graph. The graph analytics service may determine and provide the access permissions granted to the user, as represented in the bit vector, to various execution platforms in such an embodiment to implement the algorithm on the subset of the graph accessible to the user, and the user may not be made aware of the security-related operations being performed.

Example Interchange Format for Expressing Access Permission Requirements

Figure 3:
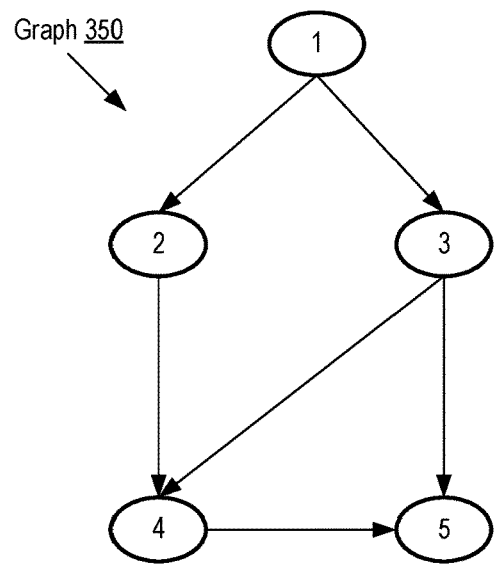
FIG. 3 illustrates an example of an interchange file format which may be used to represent graphs with vertex-specific access permissions, according to at least some embodiments.

FIG. 3 illustrates an example of an interchange file format which may be used to represent graphs with vertex-specific access permissions, according to at least some embodiments. By way of a trivial example, a graph 350 comprising five nodes and a total of six directed edges is shown. Individual edges may have respective weights associated with them in the depicted embodiment, and the vertices may have associated access permissions.

A file 301 used to represent graph 350 may comprise at least three sections according to the interchange file format being employed in the depicted embodiment. In the first section headed by the comment "#NumRows, NumColumns, NumEdges", the number of rows in an adjacency matrix representing the graph, the number of columns in the matrix, and the number of non-zero values in the graph (where each edge in the graph corresponds to a given non-zero value in the matrix) may be indicated. In the second section of the graph, headed by the comment "#Edges with weights", one line per edge may be provided, with a given line indicating the source vertex identifier of a directed edge, the destination vertex identifier, and an optional weight. Thus, for example, the line "1 2 1" indicates that an edge from vertex 1 to vertex 2 has a weight 1, the line "4 5 0.25" indicates that an edge from vertex 4 to vertex 5 has a weight 0.25, and so on.

A third section of file 301, starting with the comment line "#Required permissions and key URIs for vertices" indicates access permission requirements for the vertices of graph 350 in the depicted embodiment. One line is included in this section for each of the vertices in the example shown, indicating an access permission expression and a Uniform Resource Identifier (URI) key indicating a network location from which contents of the vertex may be obtained. In the depicted embodiment, a number of different access permission settings may be expressed using tokens such as "A" "B" and the like, and the particular combination of permissions which would enable a given user to access a given vertex may be indicated by a Boolean combination of tokens (or a single token). For example, the expression "A|B" (where the symbol "|" represents the Boolean "OR" operator) in the line for vertex 3 indicates that a user must have been granted at least one permission from the set {A, B} in order for the data of vertex 3 to be processed during the execution of a graph analytics algorithm. The description or descriptions (if any) of the tokens "A", "B", etc., as well as an indication of which entities are granted which of the permissions associated with the tokens, may be stored separately in the depicted embodiment, e.g., at an authorization service. In at least one embodiment, input provided to the graph analytics service via a programmatic interface may include respective files (or combinations of files) expressed in a format similar to that shown in FIG. 3 for various graph data sets. It is noted that a file format similar to that may be used for other purposes than for enforcing security constraints in at least some embodiments—e.g., such a format may be used for compact representation of graphs to be transmitted from one program to another in a pipeline of analytics programs, and so on. The format used in some embodiments may be designed for compatibility with industry standard graph representation formats in some embodiment, such as various standards published by organizations such as NIST (National Institute of Standards and Technology) in the USA. It is noted that any appropriate file format or data structure may be used to represent graph structure and access permission requirement information in various embodiments; the example shown in FIG. 3 is not intended to be limiting.

Applying Access Permissions During Graph Traversal

Figure 4:
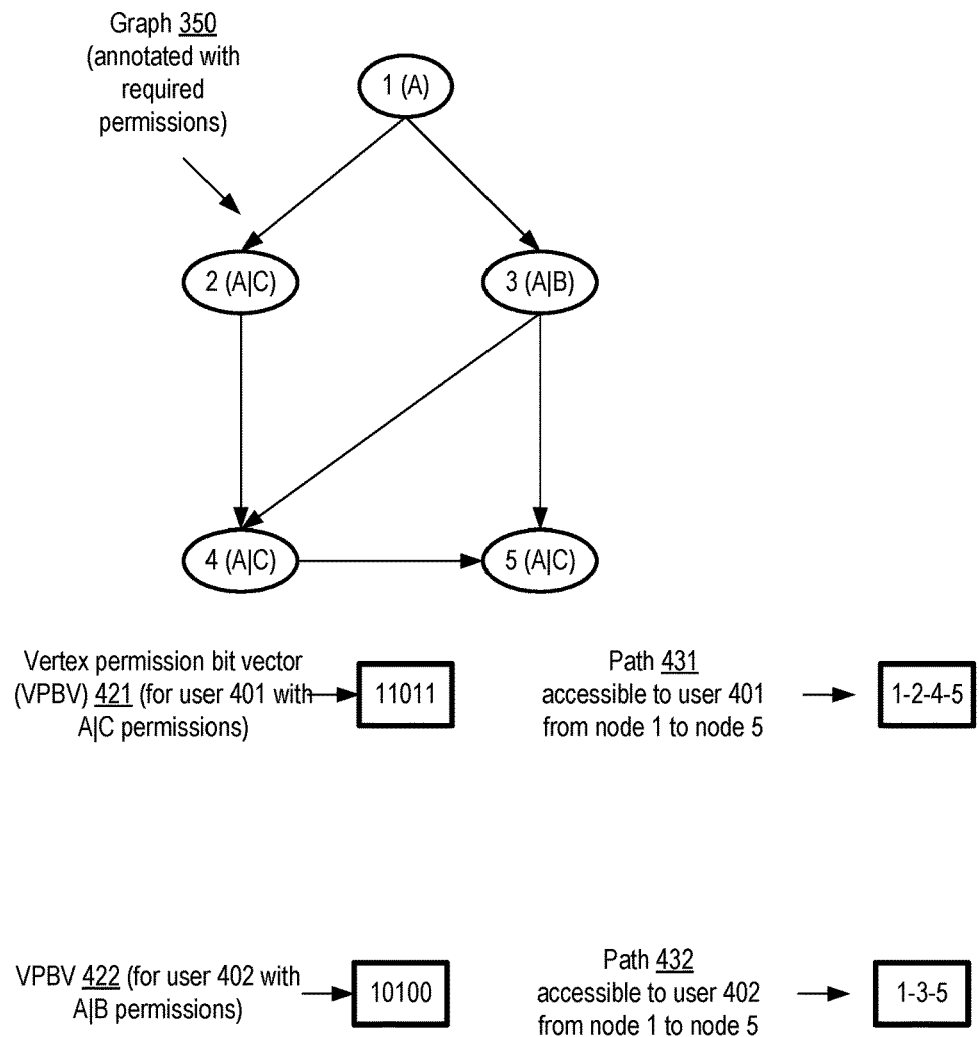
FIG. 4 illustrates an example of applying vertex-specific access permissions in a graph traversal algorithm, according to at least some embodiments.

FIG. 4 illustrates an example of applying vertex-specific access permissions in a graph traversal algorithm, according to at least some embodiments. In FIG. 3, example graph 350 of FIG. 3 has been annotated to show the permissions required to access the content of various vertices. A graph analytics algorithm which comprises identifying one or more paths between node 1 and node 5 of annotated graph 350 is to be run on behalf of two different users 401 and 402 in the depicted embodiment.

In at least one embodiment, vertex permissions bit vector VPBV 421 may be generated on behalf of user 401 for graph 350, and VPBV 422 may be generated on behalf of user 402 for graph 350. In the depicted embodiment, a bit at a given offset in a VPBV, if set to 1, may indicate that permission is granted to the corresponding user to access a vertex mapped to the offset, and if set to 0, may indicate that permission is not granted. Thus, VPBV 421 (11011) indicates that access to nodes 1, 2, 4 and 5 is granted to user 401, while VPBV 422 (10101) indicate that access to nodes 1, 3 and 5 is granted to user 402.

Two paths exist in graph 350 between vertex 1 and vertex 5. The first path (path 431) involves traversing nodes 1, 2, 4 and 5, while the second path (path 432) involves traversing nodes 1, 3 and 5. Because the permissions granted to user 401 do not allow access to node 3, only the first path 431 may be used or traversed on behalf of user 401 when executing a requested algorithm in the depicted embodiment. Similarly, because the permissions granted to user 402 do not allow access to node 2 or to node 4, only the second path 432 may be traversed on behalf of user 402 in the depicted embodiment.

Example Graph Analytics System Architecture Layers

Figure 5:
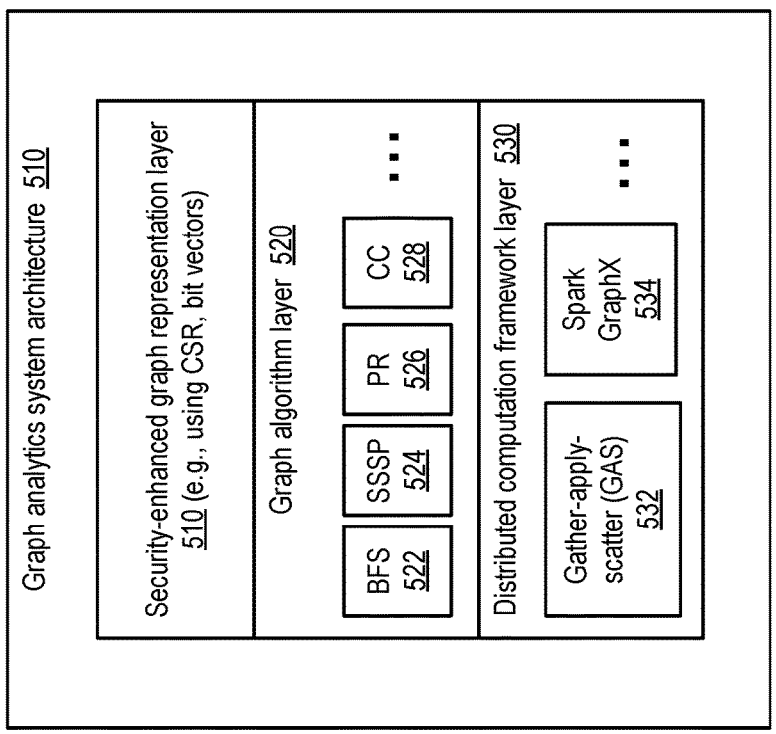
FIG. 5 illustrates example layers of a graph analytics system architecture, according to at least some embodiments.

FIG. 5 illustrates example layers of a graph analytics system architecture, according to at least some embodiments. As shown, a given implementation of a graph analytics system architecture 510 may comprise at least three layers in one embodiment, such as a security-enhanced graph representation layer 510, a graph algorithms layer 520, and a distributed computation framework layer 530. The graph analytics system may be subdivided into layer combinations other than the three example layers shown in FIG. 5 in some embodiments.

A number of different data structures may be used to represent graph data at layer 510 in the depicted embodiment, including for example compressed sparse row (CSR) data structures or CSC (compressed sparse column) data structures for the graph vertices and edges, bit vectors representing permissions for elements of various {entity, graph} combinations, and so on. When transmitting graph data (e.g., from one program to another), an interchange format similar to that shown in FIG. 3 may be used in some embodiments. In an embodiment in which input data from multiple sources using different formats is received for graph analytics algorithms, layer 510 may comprise one or more code modules for translating from one format to another—e.g., from CSR to CSC or vice versa. In one embodiment, a graph analytics system may support a plurality of formats for representing graph data, including for example a Resilient Distributed Dataset (RDD) format, a Resource Description Framework (RDF) format, a data frames format (which may be supported in, for example, the R programming language or the PANDAS data analysis toolkit), and so on.

In the depicted embodiment, the graph analytics system may be capable of executing a variety of algorithms (including, but not limited to, vertex-centric, edge-centric or path-centric algorithms) on graph data. The algorithms layer 530 may include, for example, modules to implement one or more variants of breadth first search (BFS) algorithms, single-source shortest path (SSSP) algorithms, web page ranking (PR) algorithms, connected components (CC) algorithms and so on. Each of the modules may comprise code for enforcing access permissions using bit vectors in the depicted embodiment.

The algorithms may be implemented using a variety of underlying parallel or distributed computation frameworks and associated execution platforms in at least one embodiment. The distributed computation framework layer 540 may include support for, among others, a gather-apply-scatter model 532 of computation, a Spark GraphX model 534, or other models in the depicted embodiment. In one embodiment, a bulk synchronous parallel (BSP) processing model may be supported. Each of the frameworks and models may provide a respective API (application programming interface), runtime system and utility library in some embodiments. One or more of the frameworks may be able to exploit parallel processing features of various types of execution platforms in some embodiments, such as the SIMD (Single Instruction Multiple Data) processing and memory coalescing capabilities supported by various GPU-based servers.

GAS Framework

Figure 6:
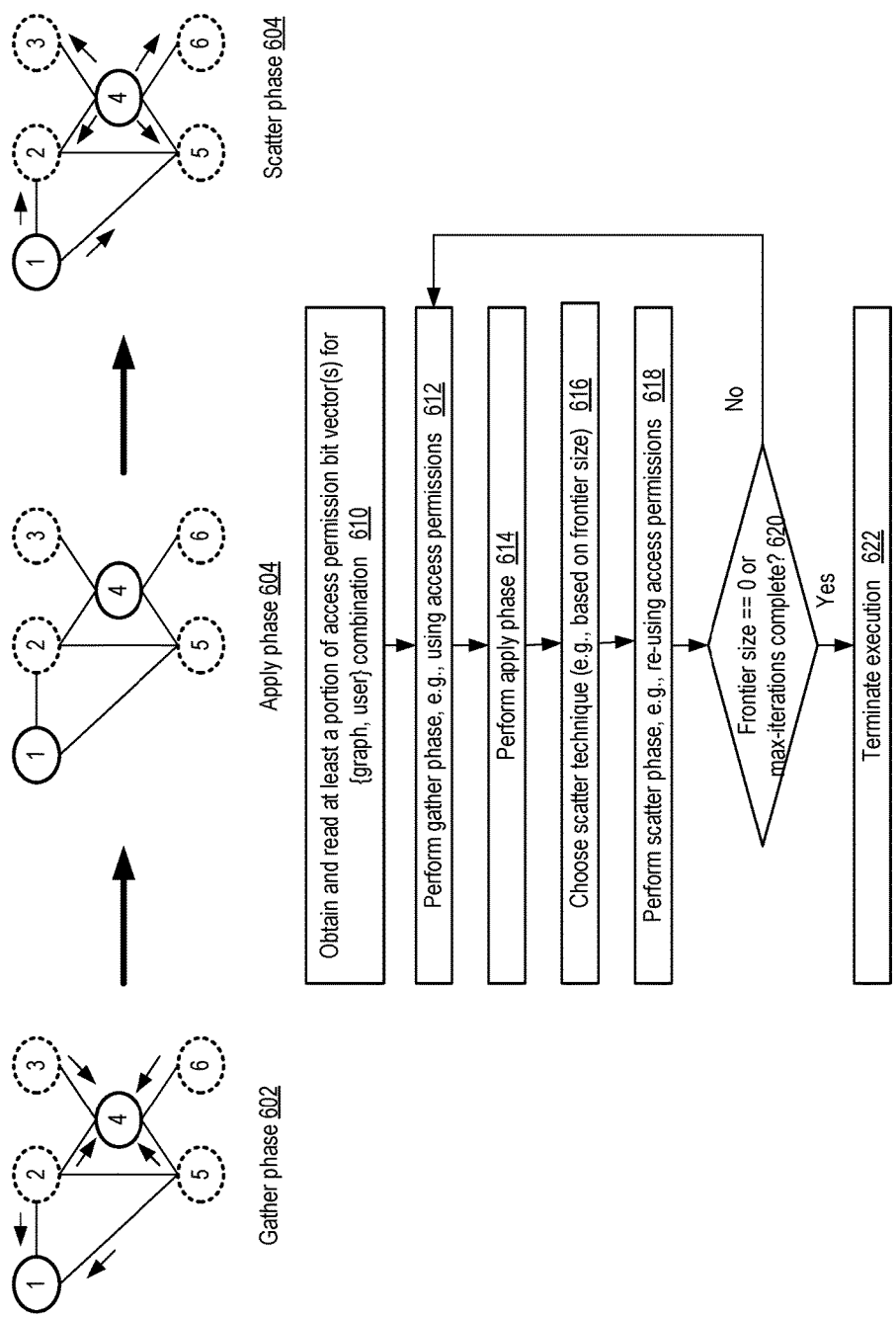
FIG. 6 illustrates aspects of example operations which may be performed during iterations of a graph analytics algorithm implemented using a gather-apply-scatter model, according to at least some embodiments.

As mentioned in the context of FIG. 5, a gather-supply-scatter model of parallel computation may be used to perform various graph analytics algorithms in some embodiments. FIG. 6 illustrates aspects of example operations which may be performed during iterations of a graph analytics algorithm implemented using a gather-apply-scatter model, according to at least some embodiments.

The gather-apply-scatter or GAS model may be based on a pattern of operations common to many types of graph analytics algorithms. At a high level, in at least some embodiments, a typical GAS computation may consist of three stages: a data preparation stage, an iteration stage, and an output stage. The data preparation stage may initialize the graph, the vertex and edge values, and identify the initial frontier for the computation (the frontier is the set of vertices that are active in a given iteration) in some embodiments. The iteration stage may consist of a sequence of iterations that update the vertex values and edges values until the algorithm terminates in at least one embodiment. Each iteration may update vertices that are in the current frontier and define the frontier for the next iteration in such embodiments. The output stage may store and/or transmit the results of the iterative computations in various embodiments.

Each GAS iteration may in turn consist of three conceptual execution phases in the depicted embodiment: gather, apply, and scatter. The gather phase may assemble information from adjacent edges and vertices, e.g., through a generalized sum over the neighborhood of the central vertex. It may read on the in-edges, the out-edges, or both. For example, in the embodiment depicted in FIG. 6, during gather phase 602, data may be collected at vertex 4 along edges to adjacent vertices 2, 3, 5 and 6 by invoking a gather function or method on each edge or adjacent vertex, and data may be collected at vertex 1 from adjacent vertices 2 and 5. The apply phase may involve computations at each vertex in the current frontier and update the value of the vertex. In an apply phase 604 of FIG. 6, computations or functions may be performed on the collected data, e.g., at vertices 4 and 1. The scatter phase may distributes message to the adjacent edges and vertices of the central vertex, and may operate on the in-edges, the out-edges, or both in various embodiments. In scatter phase 606 of FIG. 6, data such as results of the apply phase computations may be transmitted to neighbor vertices, e.g., from nodes 1 and 4 in the depicted embodiment.

Access permissions, as represented in a bit vector, may be utilized during at least some phases of the GAS model in the depicted embodiment. A bit vector may be generated, e.g., at a graph analytics service component during the data preparation stage, representing access permissions granted to one or more entities such as users and groups. The bit vector may be transmitted to, and obtained and read at, a number of execution platforms at which a particular analytics algorithm is to be run (element 610 of FIG. 6) in one embodiment. A set of vertices may be identified for initial processing from among the vertices of the input graph data set on which the algorithm is to be executed, and the gather phase of a first iteration of the algorithm may be performed taking the access permissions into account in the depicted embodiment (element 612). For example, if a portion of the bit vector indicates that a user on whose behalf the algorithm is being performed does not have access to node 3, but does have access to nodes 2, 5 and 6 in the depicted example scenario, data may be gathered at node 4 from nodes 2, 5 and 6 but not from node 3.

Computations of the apply phase may be implemented next in the depicted embodiment (element 614), e.g., at each of the vertices at which respective gather phases are performed. In at least one embodiment, depending for example on the specifics of the algorithm being used, a frontier of vertices or edges may be computed, indicating the set of vertices or edges to be considered in the next iteration. Depending on the size of the frontier, a particular technique to be used for a scatter phase may be selected in some embodiments (element 616). For example, in some embodiments, if the frontier size exceeds a threshold, a technique called two-phase decomposition may be selected; otherwise a technique called dynamic scheduling may be used. In a first phase of the two-phase scheduling technique, referred to as a scheduling phase, in one embodiment an efficient sorted search may be performed on vertex adjacency lists to identify groups of vertices with equal numbers of adjacent vertices. Then, in a second phase referred to as a computation phase, each thread may access the same number of adjacent vertices and perform the same operation in such an embodiment. In the dynamic scheduling technique, in one embodiment workload may be distributed among threads of execution based on the degree of the vertices. In other embodiments, alternatives other than two-phase decomposition or dynamic scheduling may be used for the scatter phase. The selected scatter technique may be executed in the depicted embodiment (element 618), during which the access permissions information of the bit vector may again be used, e.g., to limit the set of vertices to which messages are sent. If the frontier size is zero or if a maximum number of iterations for which resources are available has been reached, as determined in element 620, the execution of the algorithm may be terminated in the depicted embodiment (element 622); otherwise, operations corresponding to elements 612 onwards may be performed for the next iteration.

Methods for Implementing Graph Analytics Using Access Permission Bit Vectors

Figure 7:
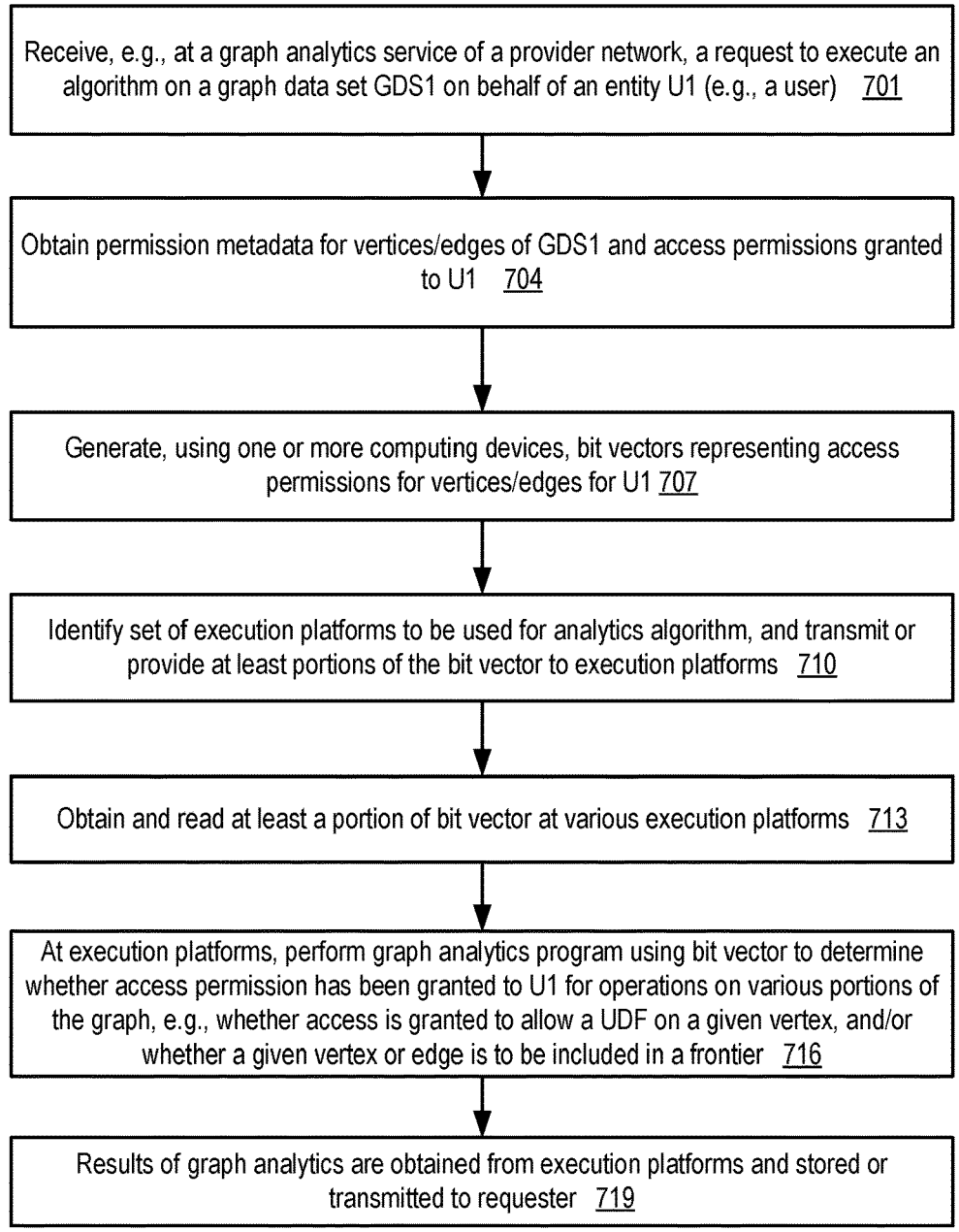
FIG. 7 is a flow diagram illustrating aspects of operations which may be performed to implement graph analytics algorithms for graphs with vertex-level or edge-level access permissions, according to at least some embodiments.

FIG. 7 is a flow diagram illustrating aspects of operations which may be performed to implement graph analytics algorithms for graphs with vertex-level or edge-level access permissions, according to at least some embodiments. As shown in element 701, a request to perform or execute a graph analytics algorithm on a particular graph data set GDS1 on behalf of a particular entity such as a user account U1 may be received, e.g., at a network-accessible analytics service of a provider network in the depicted embodiment.

In some embodiments, access permission metadata for the vertices and/or edges of the graph data set may be obtained, indicating for example the particular levels of granted permissions, roles or responsibilities required to access the data corresponding to the vertices and edges (element 704). In addition, in at least one embodiment, the access permissions granted to the entity on whose behalf the algorithm is to be performed may also be retrieved. In some embodiments, at least some of the access permission information may be available from an authorization system or service—e.g., roles and capabilities may be defined using programmatic interfaces of such a service, and the metadata may be retrieved using the programmatic interfaces.

A bit vector representing access permissions granted to the entity for various vertices and/or edges of the graph may be generated in the depicted embodiment (element 707). In one embodiment, for large graphs which may for example comprise millions or billions of vertices or edges, the process of generating the bit vector may be parallelized—e.g., different portions of the bot vector may be generated at respective computing devices, and the portions may be aggregated to obtain the complete bit vector. In some embodiments, the bits of the vector may correspond to respective vertices, while in other embodiments at least some bits of the vector may correspond to respective edges. In one embodiment, different permissions may be granted to a given entity for respective algorithms—e.g., user U1 may be permitted to run algorithm A1 on a particular set {V1} of vertices of a given graph data set, and run algorithm A2 on a different set {V2} of vertices. In such a scenario, multiple bit vectors may be generated for the same {entity, graph} combination for the different algorithms.

A set of one or more execution platforms may be selected for the graph analytics algorithm (element 710) in the depicted embodiment. The members of the set may be selected based on various factors, such as the availability of currently unused platforms in a pool of platforms of a computing service, the size of the graph data set, the type of algorithm, the speed at which the results are desired by the requester, and so on in various embodiments. A variety of virtual and/or physical execution platform types may be used in the depicted embodiment, such as platforms comprising one or more of: (a) a graphical processing unit (GPU), (b) a central processing unit (CPU), (c) at least one CPU and at least one GPU, (d) a field programmable gate array (FPGA) device, or (e) an accelerator comprising a system on chip (SOC). In some embodiments, a given execution platforms may comprise a plurality of hardware or software threads of execution. At least a portion of the bit vector may be provided or transmitted to individual ones of the execution platforms. In some embodiments, different partitions or portions of the bit vector may be provided to respective execution platforms.

The portions (or all) of the bit vector may be obtained and read at the execution platforms (element 713) in the depicted embodiment. At one or more of the execution platforms, the graph analytics algorithm may be performed (element 716), with the portions of the bit vector being used to determine whether access permissions have been granted to the entity U1 on whose behalf the algorithm is being run in various embodiments. For example, in a given iteration of the algorithm, access permission granted to U1 regarding a given vertex V1 may be verified before adding a given vertex to a frontier (and the vertex may be excluded from the frontier if the permission is not granted) in some embodiments. Similarly, before running a user defined function (UDF) on a vertex or edge, the service may verify that access permission to that vertex or edge has been granted in various embodiments.

Results of the execution of the analytics algorithm may be stored and/or transmitted to one or more destinations such as the source of the request to run the algorithm (element 719) in the depicted embodiment. In at least some embodiments, the bit vector may be re-used, e.g., during different iterations of the graph analytics algorithm and/or to run different graph analytics algorithms on the same graph data set GDS1 for the same user U1 (or another user U2 to whom the same access permissions have been granted).

It is noted that in various embodiments, some of the operations shown in FIG. 7 may be implemented in a different order than that shown in the figure, or may be performed in parallel rather than sequentially. Additionally, some of the operations shown in FIG. 7 may not be required in one or more implementations.

Provider Network Environment

Figure 8:
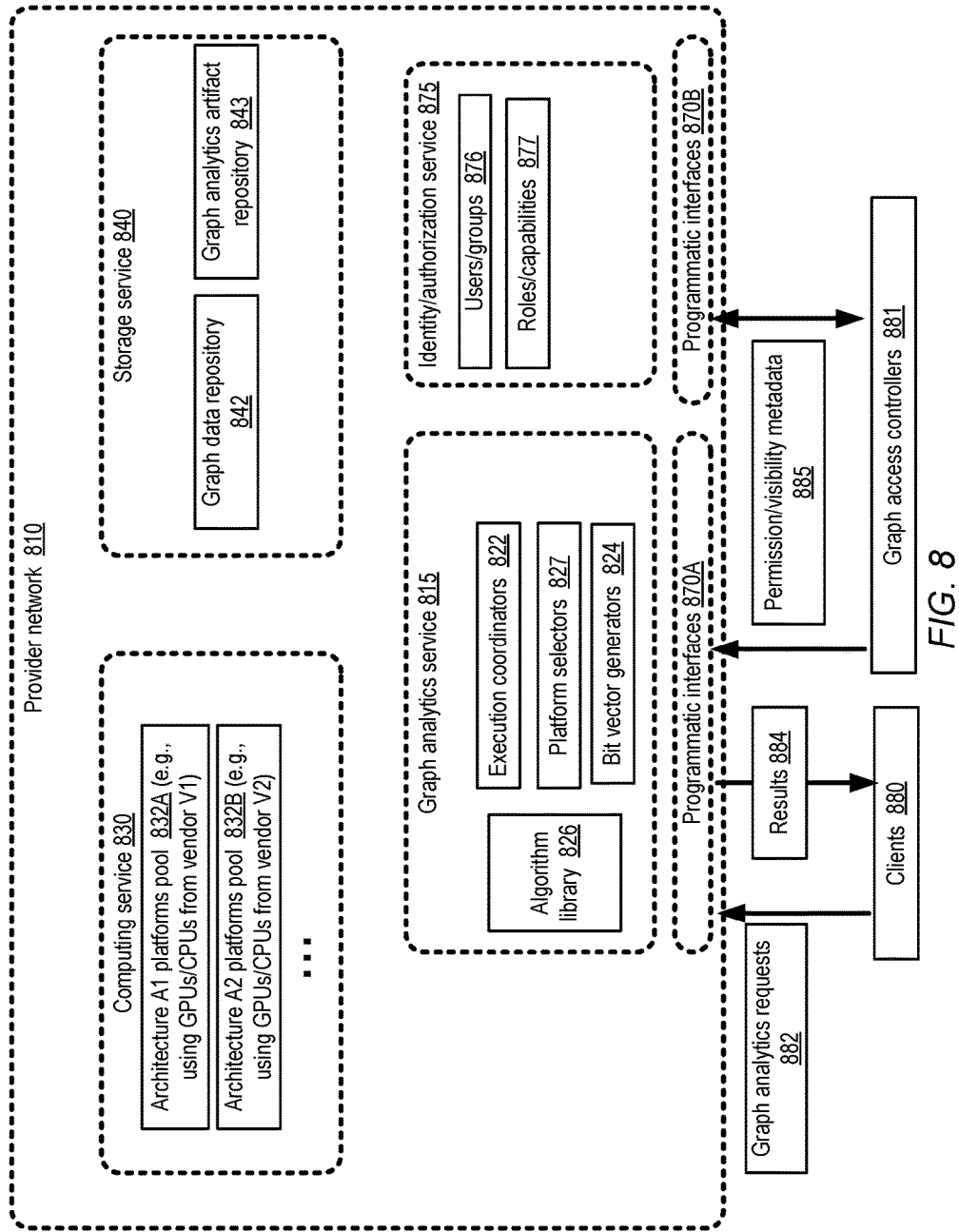
FIG. 8 illustrates an example of a provider network environment at which a graph analytics service may be implemented, according to at least some embodiments.

FIG. 8 illustrates an example of a provider network environment at which a graph analytics service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

As shown, provider network 810 may comprise, among others, a computing service 830, a storage service 840, an identity and authorization service 875 and a graph analytics service 815 in the depicted embodiment. The computing service 830 may comprise computing platforms representing a variety of hardware and software architectures in one embodiment. A first pool 832A of the computing service may comprise physical and/or virtual machines corresponding to one architecture A1 in the depicted embodiment, e.g., machines which comprise GPUs and/or CPUs from a first vendor V1, while a different pool 832B may comprise physical and/or virtual machines corresponding to a different architecture A2, e.g., with GPUs and/or CPUs from a different vendor V2. The programming models may differ for the different architectures in some embodiments—e.g., Architecture A1 may require compute kernels compatible with CUDA, architecture A2 may require compute kernels compatible with OpenCL (Open Computing Language), and so on. In some embodiments architectures based on FPGAs (field programmable gate arrays) and/or custom accelerators comprising SOCs may be supported. Different executable versions of graph analytics programs, each using respective compute kernels optimized or tuned specifically for the corresponding architecture, may be prepared for the various pools 832 in the depicted embodiment.

In some embodiments, a storage service 840 may be utilized to store various data sets and representations of other software objects associated with graph program preparation and execution. For example, the input graph data and associated bit vectors may be stored at graph data repository 842, and artifacts such as program source code, platform-specific compute kernels or user-defined functions corresponding to various operators, executable versions of the programs for various platforms, program execution results, and the like may be stored in a graph analysis artifact repository 844 in the depicted embodiment. Any of a number of different types of storage services may be used in various embodiments, such as database service which implements a graph data model, a relational data model or a non-relational data model, a storage service which provides access to arbitrary storage objects using web-service interfaces, a storage service which implements storage volumes providing a block device interface, and so on. In some embodiments, the graph data itself may be stored using a different service than the artifacts. In at least one embodiment, the execution platforms used for the graph analysis programs may include (or have access to) one or more distributed parallel file systems or shared-nothing file systems. The identity/authorization service 875 may comprise, for example, user/group metadata 876 and roles/capabilities 877 as well as associated mappings in the depicted embodiment. One or more graph access controllers 881 may indicate the access permissions granted with respect to the elements (e.g., vertices and/or edges) of various graphs to different entities such as users/groups in the depicted embodiment. In some embodiments, the graph-level authorization requirements may also be stored at the identity and authorization service 875, e.g., as a result of requests submitted via programmatic interfaces 870B by the access controllers 881.

The graph analytics service 815 may comprise several components in the depicted embodiment, including for example bit vector generators 824, platform selectors 827 and execution coordinators 822 in addition to an algorithm library 826. Bit vector generators 824 may create the bit vectors for different {entity, graph} combinations or different {entity, graph, algorithm} combinations in the depicted embodiment, e.g., based on permission/visibility metadata 885 provided via programmatic interfaces 870A by the access controllers 881. In one embodiment, bit vector generators may obtain at least some of the metadata needed for generating the bit vectors (e.g., mappings between users/groups and roles/capabilities) directly from the identity/authorization service 875. In one embodiment, a bit vector may be generated in response to a graph analytics request 882 received at the service 815 via programmatic interfaces 870A from a client 880. In another embodiment, at least some of the bit vectors for different users and a given graph data set may be generated in advance, e.g., before a request 882 is received. The platform selectors 827 may be responsible for identifying the platforms (e.g., the particular architecture A1, A2, etc.) which are to be used to execute a given graph analytics algorithm requested by a client, as well as the number of platforms to be used in parallel in the depicted embodiment. In some embodiments, the selection of the platforms may be left entirely to the service 815, while in other embodiments a client 880 (e.g., an application developer or application owner) may indicate preferences regarding the platforms to be used (for example, during initial testing of the program, a developer may indicate that a single CPU-based platform will suffice for the program). In embodiments in which the service 815 selects the platforms, a number of factors may be taken into consideration, such as for example the number of available platforms in the pools 832, the extent to which the program can be parallelized, cost/billing considerations, and so on.

In one embodiment, the execution coordinators 822 may transmit the graph data, accompanying access metadata including portions or all of the bit vector, as well as an indication of the algorithm (or kernels implementing the algorithm) to selected platforms of the computing service 830 for execution, and obtain the results from the computing service. The results 884 may be provided to clients 880 via the programmatic interfaces 870A in one embodiment, and/or stored (e.g., at storage service 840). Programmatic interfaces 870A and 870B may comprise, for example, web-based consoles, application programming interfaces (APIs), command-line tools and/or graphical user interfaces in some embodiments. A variety of graph analytics algorithms may be included in library 826 in the depicted embodiment, including various algorithms for BFS, SSSP, CC, PR and the like. In one embodiment, optimizations of various kinds may be identified and implemented at the graph analytics service 815 at various stages in the process of implementing the graph analytics algorithms. It is noted that the functions indicated for the components of the service 815 may be performed by a standalone tool or a set of tools in one embodiment; that is, a network-accessible service (or any other service of a provider network) is not a requirement for the kinds of access permission management techniques described above for graph analytics algorithms.

Illustrative Computer System

Figure 9:
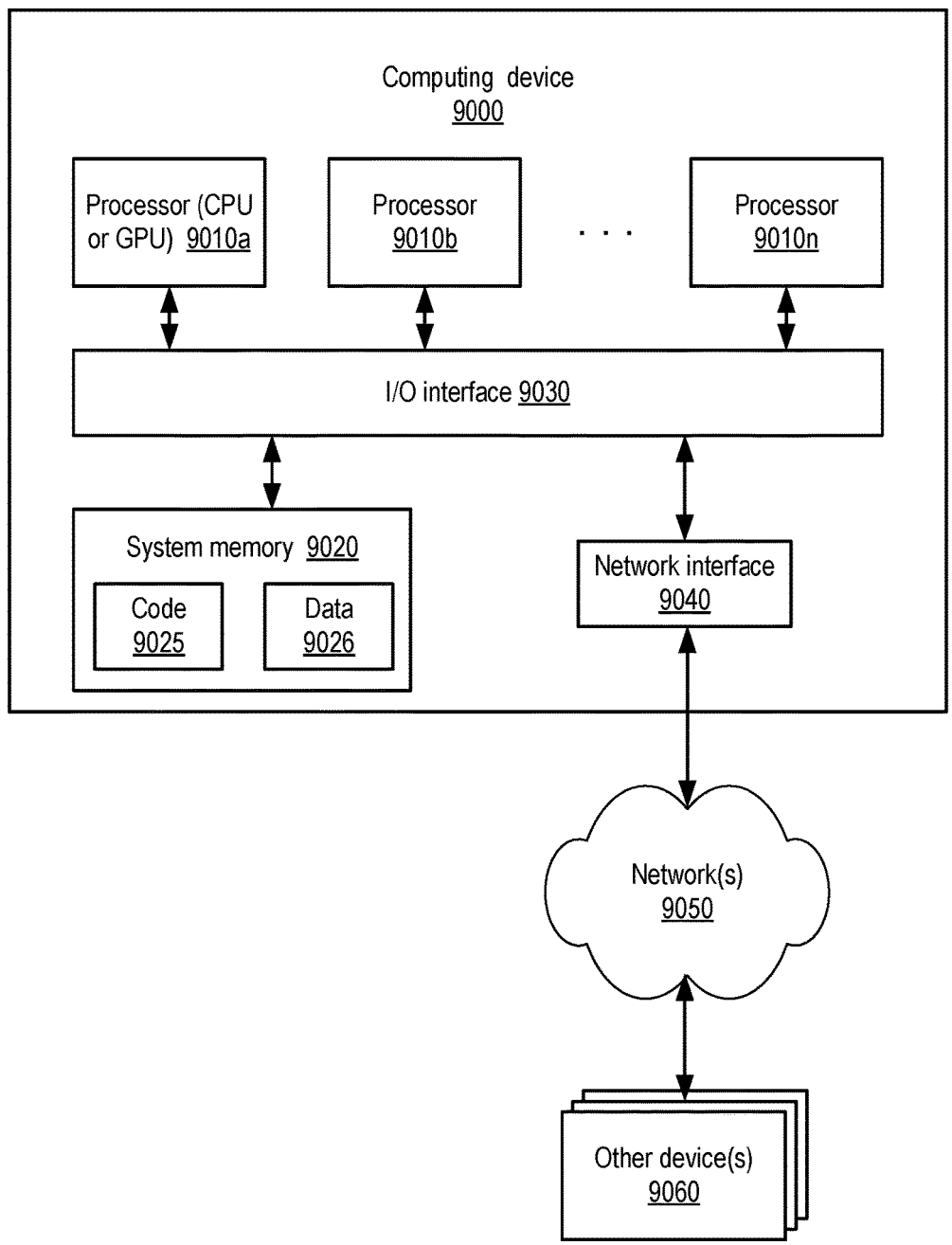
FIG. 9 is a block diagram illustrating an example computing device that may be used in at least some embodiments.

In at least some embodiments, a server that implements one or more of the techniques described above for enforcing access permission or other security constraints during executions of graph analytics algorithms, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors or CPUs.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. In various embodiments, the term "computing device" may refer to one or more of these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
 performing, by one or more processors and memory:
  generating a bit vector representing one or more access permissions associated with respective vertices of a graph data set;
  reading at least a portion of the bit vector;
  performing a first graph analytics algorithm, wherein the performing the algorithm includes determining, based at least in part on a portion of the bit vector, whether access permission to one or more vertices of the graph data set is granted; and
  transmitting to a client, via a network, results of execution of the algorithm based on the one or more vertices of the graph data set to which the access permission was granted.

2. The method as recited in claim 1, wherein said performing the algorithm comprises excluding, based at least in part on determining that the access permission is not granted, a first vertex of the one or more vertices from a frontier of vertices generated in an iteration of the first graph analytics algorithm.

3. The method as recited in claim 1, wherein said performing the algorithm comprises implementing, based at least in part on determining that the access permission is granted with respect to a first vertex of the one or more vertices, a user defined function associated with the first vertex.

4. The method as recited in claim 1, further comprising:
 providing, to one or more execution platforms at which the first graph analytics algorithm is performed, at least the portion of the bit vector, wherein a first execution platform of the first plurality of execution platforms comprises one or more of: (a) a graphical processing unit (GPU), (b) a central processing unit (CPU), (c) a device comprising at least one CPU and at least one GPU, (d) a field programmable gate array (FPGA) device, or (e) an accelerator comprising a system on chip (SOC).

5. The method as recited in claim 1, wherein a first execution platform of the plurality of execution platforms at which the first graphics analytics algorithm is performed comprises a plurality of threads including a first thread and a second thread, the method further comprising:
 storing, by the first thread in a first portion of a data structure, wherein the first portion corresponds to a first vertex of the graph data set, a symbol indicating that an operation is not to be performed on the first vertex; and
 determining, by the second thread, based on examination of the first portion, not to perform the operation on the first vertex.

6. The method as recited in claim 1, further comprising:
 receiving, via a programmatic interface of a graph analytics service, an indication of the one or more access permissions.

7. The method as recited in claim 6, wherein the indication of the one or more access permissions comprises a Boolean combination of a plurality of authorization tokens.

8. The method as recited in claim 1, wherein said generating the bit vector comprises:
 aggregating a plurality of portions of the bit vector, including a first portion generated at a first computing device, and a second portion generated at a second computing device.

9. The method as recited in claim 1, wherein the bit vector comprises a first bit indicating an access permission granted to a first edge of the graph data set, wherein the performing the algorithm comprises determining, based at least in part on the first bit, whether an operation associated with the first edge is to be performed.

10. The method as recited in claim 1, further comprising:
 storing the bit vector; and
 utilizing the bit vector during an execution of a second graph analytics algorithm.

11. A system, comprising:
 memory storing program instructions that, if executed by one or more processors, cause the one or more processors to:
  generate a first bit vector representing one or more access permissions associated with respective vertices of a graph data set;
  read at least a portion of the first bit vector;
  perform a first graph analytics algorithm, wherein to perform the first graph analytics algorithm, the instructions, if executed, cause the one or more processors to determine, based at least in part on a portion of the first bit vector, whether access permission to one or more vertices of the graph data set is granted; and transmit to a client, via a network, results of execution of the algorithm based on the one or more vertices of the graph data set to which the access permission was granted.

12. The system as recited in claim 11, wherein to perform the first graph analytics algorithm, the instructions, if executed, cause the one or more processors to include, based at least in part on determining that the access permission is granted, a first vertex of the one or more vertices in a frontier of vertices generated in an iteration of the first graph analytics algorithm.

13. The system as recited in claim 11, to perform the first graph analytics algorithm, the instructions, if executed, cause the one or more processors to perform, based at least in part on determining that the access permission is granted, a user defined function.

14. The system as recited in claim 11, wherein at least a portion of the first graph analytics algorithm is performed at a first execution platform comprising one or more of: (a) a graphical processing unit (GPU), (b) a central processing unit (CPU), (c) a device comprising at least one CPU and at least one GPU, (d) a field programmable gate array (FPGA) device, or (e) an accelerator comprising a system on chip (SOC).

15. The system as recited in claim 11, wherein the first bit vector represents one or more access permissions granted to a first entity, wherein the instructions, if executed, cause the one or more processors to:

generate a second bit vector representing one or more access permissions which are (a) granted to a second entity and (b) associated with one or more portions of the graph data set; and utilize the second bit vector to perform the first graph analytics algorithm on behalf of the second entity.

16. A non-transitory computer-accessible storage medium storing program instructions that when executed on one or more processors cause the one or more processors to perform a method comprising:

generating a bit vector representing one or more access permissions associated with respective vertices of a graph data set;

performing a first graph analytics algorithm, wherein the performing includes determining, based at least in part on a portion of the bit vector, whether to perform an operation on one or more vertices of the graph data set; and transmitting to a client, via a network, results of execution of the operation based on the one or more vertices of the graph data set to which the access permission was granted.

17. The non-transitory computer-accessible storage medium as recited in claim 16, wherein the operation comprises including a first vertex of the one or more vertices in a frontier of vertices generated in an iteration of the first graph analytics algorithm.

18. The non-transitory computer-accessible storage medium as recited in claim 16, wherein the operation comprises executing a user defined function.

19. The non-transitory computer-accessible storage medium as recited in claim 16, wherein the first graph analytics algorithm comprises one or more of: (a) a breadth first search algorithm, (b) a single source shortest path algorithm, (c) a page ranking algorithm or (d) a connected components algorithm.

20. The non-transitory computer-accessible storage medium as recited in claim 16, wherein the method comprises:

acquiring at least a first execution platform from a network-accessible computing service of a provider network; and causing at least a portion of the first graph analytics algorithm to be performed at the first execution platform.

* * * * *